(12) United States Patent
Wendling

(10) Patent No.: US 8,832,646 B1
(45) Date of Patent: Sep. 9, 2014

(54) OBFUSCATION OF AUTOMATICALLY GENERATED CODE

(75) Inventor: Bill Wendling, Palo Alto, CA (US)

(73) Assignee: The MathWorks, Inc., Natick, MA (US)

(*) Notice: Subject to any disclaimer, the term of this patent is extended or adjusted under 35 U.S.C. 154(b) by 941 days.

(21) Appl. No.: 12/732,551

(22) Filed: Mar. 26, 2010

Related U.S. Application Data

(63) Continuation of application No. 11/038,608, filed on Jan. 18, 2005, now Pat. No. 7,689,969.

(51) Int. Cl.
*G06F 9/44* (2006.01)

(52) U.S. Cl.
USPC .......................................... 717/113; 717/105

(58) Field of Classification Search
USPC .......................... 717/105, 109, 110, 111, 113
See application file for complete search history.

(56) References Cited

U.S. PATENT DOCUMENTS

| | | | |
|---|---|---|---|
| 4,831,525 A | | 5/1989 | Saito et al. |
| 5,269,014 A | * | 12/1993 | Ogino ............................. 703/22 |
| 6,212,672 B1 | | 4/2001 | Keller et al. |
| 6,226,692 B1 | | 5/2001 | Miloushev et al. |
| 6,507,166 B2 | | 1/2003 | Maceratini et al. |
| 6,668,325 B1 | * | 12/2003 | Collberg et al. ............. 713/194 |
| 6,961,686 B2 | | 11/2005 | Kodosky et al. |
| 6,971,065 B2 | | 11/2005 | Austin |
| 7,051,200 B1 | * | 5/2006 | Manferdelli et al. ......... 713/153 |
| 7,124,445 B2 | | 10/2006 | Cronce et al. |
| 7,155,702 B2 | | 12/2006 | Krishna et al. |
| 7,216,334 B2 | | 5/2007 | Kodosky et al. |
| 2002/0007483 A1 | | 1/2002 | Lopez |
| 2002/0016954 A1 | | 2/2002 | Charisius et al. |
| 2003/0023859 A1 | | 1/2003 | Kiddy |
| 2003/0071845 A1 | * | 4/2003 | King et al. ..................... 345/764 |
| 2003/0076355 A1 | | 4/2003 | Kodosky |
| 2003/0172369 A1 | | 9/2003 | Kodosky et al. |
| 2003/0196187 A1 | | 10/2003 | Kodosky et al. |
| 2004/0034846 A1 | | 2/2004 | Ortal et al. |
| 2006/0259871 A1 | | 11/2006 | Washington et al. |
| 2006/0265446 A1 | * | 11/2006 | Elgressy et al. ............. 709/200 |
| 2006/0271921 A1 | | 11/2006 | Cronce et al. |
| 2006/0272023 A1 | | 11/2006 | Schmeidler et al. |

OTHER PUBLICATIONS

Linn, Cullen et al., "Obfuscation of Executable Code to Improve Resistance to Static Disassembly," Proceedings of the 10th ACM Conference on Computer and Communications Security, pp. 290-299 (2003).

Schneier, Bruce, "Opinion: Cryptanalysis of MD5 adn SHA: Time for a New Standard," retreived online at: http://www.computerworld.com/s/article/95343/Opinion_Cryptanalysis_of_MD5_and_SHA_Time_for_a_new_standard (2004).

Sosonkin, Mikhail et al., "Obfuscation of Design Intent in Object-Oriented Applications," Proceedings of the 3rd ACM Workshop on Digital Rights Management, pp. 142-153 (2003).

The MathWorks, "Simulink Model-Based and System-Based Design, Writing S-Functions, Version 5," The MathWorks, Inc., (2002).

Wang, Xiaoyun et al., "Collisions for Has Functions, MD4, MD5, HAVAL-128 and RIPEMD," retreived online at: http://eprint.iacr.org/2004/199 (2004).

* cited by examiner

*Primary Examiner* — Anna Deng
(74) *Attorney, Agent, or Firm* — Nelson Mullins Riley & Scarborough LLP

(57) ABSTRACT

A method is provided for obfuscating code generated from a block diagram model in a graphical programming environment. The obfuscation may be removed through the use of a password. Incorporating the obfuscated code in a block diagram allows for code to be generated from the block diagram incorporating the obfuscated code.

24 Claims, 13 Drawing Sheets

OBFUSCATION OF AUTOMATICALLY GENERATED CODE

RELATED APPLICATIONS

The present application is a continuation of U.S. application Ser. No. 11/038,608, entitled "Obfuscation of Automatically Generated Code," filed Jan. 18, 2005, the contents of which are herein incorporated by reference.

FIELD OF THE INVENTION

The present invention relates to a graphical modeling environment for modeling a dynamic system. More particularly, generating and obfuscating code from a model of a dynamic system

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically consists of automatically generating code for portions of the model, particularly portions corresponding to the system's control algorithm.

Graphical modeling environments are programs that enable a user to construct and analyze a model of a process or system. Examples of graphical modeling tools include time-based block diagrams, such as Simulink from The MathWorks Inc., discrete event diagrams and reactive state machine diagrams, such as those found within Stateflow® also available from The MathWorks, Inc., data-flow diagrams, such as LabVIEW, available from National Instruments Corporation, and software diagrams and other graphical programming environments, such as Unified Modeling Language (UML) diagrams.

Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts relationships between the systems inputs, states, parameters and outputs. After creation of the graphical model, the behavior of the dynamic system is simulated using the information entered into the graphical model. In this step, the graphical model is used to compute and trace the temporal evolution of the dynamic systems' outputs ("execute the graphical model"), and automatically produce either deployable software systems or descriptions of hardware systems that mimic the behavior of either the entire model or portions of the model (code generation).

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, that are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are assumed to have values at each time instant when connected to an enabled node. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that in terms of computational causality, the output of the first node is an input to the second node. Each distinct input or output on a node is referred to as a port. The source node of a signal writes to the signal at a given time instant when its system equations are solved. The destination node of this signal read from the signal when their system equations are being solved. Those skilled in the art will recognize that the term "nodes" does not refer exclusively to elemental dynamic systems but may also include other modeling elements that aid in readability and modularity of block diagrams.

It is worth noting that block diagrams are not exclusively used for representing time-based dynamic systems but also for other models of computation. For example, in Stateflow®, flow charts are block diagrams used to capture behavior of reactive systems and the flow of discrete state changes. Data flow blocks are block diagrams that describe a graphical programming paradigm where the availability of data is used to initiate the execution of blocks, where a block represents an operation and a line represents execution dependency describing the direction of data flowing between blocks.

From the block diagrams, source code can be generated using a tool such as the Real-Time Workshop® tool for Simulink models. In this mode, the engine (upon the behest of the user) translates a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance. Provided with the Simulink product family is the Target Language Compiler (TLC). This technology enables the creation of "active scripts" that control how the generated code is produced for a block diagram. Using TLC, one can tailor the generated code to suite their specific needs.

In some instances, a user may wish to share source code generated from a model with a third party. While the third party may need the source code for compilation, the user may not wish for the third party to be able to read or understand the source code. Thus what is needed is a method for providing generated code that is unintelligible to a human but is still intelligible to a compiler.

SUMMARY OF THE INVENTION

The present invention provides a method of obfuscating code for a block diagram such that it is unintelligible to a human but is intelligible to a compiler and still retains the original code's behavior. Thus the obfuscated code may be used in the context of another block diagram.

In accordance with a first aspect, in a graphical programming environment, a method comprises providing a block diagram model of a dynamic system and generating obfuscated code from the block diagram and incorporating obfuscated code into a block diagram model.

In accordance with another aspect, a medium for use with a computational device holding instructions executable by the computational device for performing a method. The method comprises the steps of providing a block diagram model of a dynamic system; and generating obfuscated code from the block diagram.

In accordance with another aspect, a medium for use with a computational device holding instructions executable by the computational device for performing a method. The method comprises the steps of providing obfuscated code for a model, and incorporating obfuscated code into a block diagram model.

In accordance with another aspect, a system for generating and displaying a graphical modeling application, comprises user-operable input means for inputting data to the graphical modeling application; a display device for displaying a graphical model; and a computational device including memory for storing computer program instructions and data, and a processor for executing the stored computer program instructions, the computer program instructions including instructions for providing a block diagram model of a dynamic system and generating obfuscated code from the block diagram.

In accordance with another aspect, a system for generating and displaying a graphical modeling application, comprises a distribution server for providing to a client device, obfuscated code generated from a block diagram, and a client device in communication with the distribution server.

In accordance with another aspect, in a network having a server, executing a graphical modeling environment, and a client device in communication with the server, a method comprising the steps of providing, at the server, a block diagram model of a dynamic system; and receiving, at the server from the client device, a request to generate code from the block diagram; and receiving, at the client device from the server, obfuscated code

DETAILED DESCRIPTION OF AN
ILLUSTRATIVE EMBODIMENT

An illustrative embodiment of the present invention relates to generating and using obfuscated code. The present invention will be described relative to illustrative embodiments. Those skilled in the art will appreciate that the present invention may be implemented in a number of different applications and embodiments and is not specifically limited in its application to the particular embodiments depicted herein.

Figure 1A:
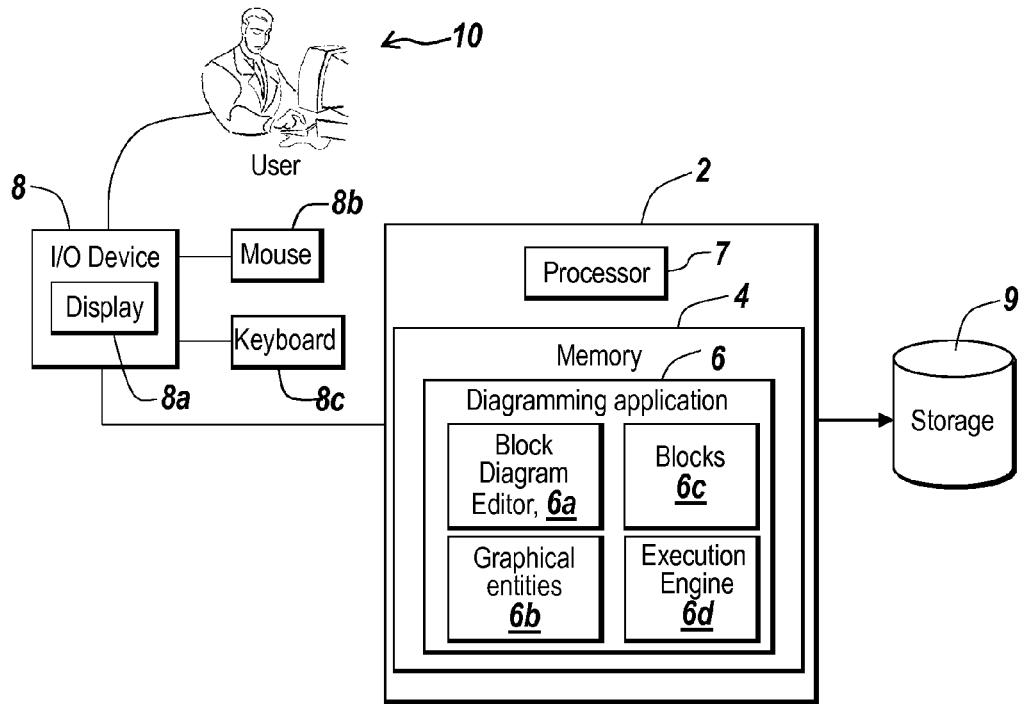
FIG. 1A illustrates an environment suitable for practicing an illustrative embodiment of the present invention.

FIG. 1A depicts an environment suitable for practicing an illustrative embodiment of the present invention. An electronic device 2 includes memory 4, on which software according to one embodiment of the present invention is stored, a processor (CPU) 7 for executing software stored in the memory, and other programs for controlling system hardware. Typically, the interaction of a human user 10 with the electronic device 2 occurs through an input/output (I/O) device 8, such as a user interface. The I/O device 8 may include a display device 8a (such as a monitor) and an input device (such as a mouse 8b and a keyboard 8c and other suitable conventional I/O peripherals).

For example, the memory 4 holds a diagramming application 6 capable of creating and simulating electronic versions of system diagrams, such as time-based block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 8a. In the illustrative embodiment, the diagramming application 6 comprises a block diagram environment, such as Simulink® or another suitable graphical modeling environment. As used herein, the terms "block diagram environment" and "graphical modeling environment" refer to a graphical application where a model is translated into executable instructions. Examples of suitable diagramming applications include, but are not limited to, MATLAB with Simulink, from the MathWorks, LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, Halcon from MVTec Software, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternative embodiment, the electronic device 2 is also interfaced with a network, such as the Internet. Those skilled in the art will recognize that the diagrams used by the diagramming application 6 may be stored either locally on the electronic device 2 or at a remote location 9 interfaced with the electronic device over a network. Similarly, the diagramming application 6 may be stored on a networked server or a remote peer.

The diagramming application 6 of an illustrative embodiment of the invention includes a number of generic components. Although the discussion contained herein focuses on Simulink, from The MathWorks, Inc. of, Natick MA, those skilled in the art will recognize that the invention is applicable to other software applications. The generic components of the illustrative diagramming program 6 include a block diagram editor 6a for graphically specifying models of dynamic systems. The block diagram editor 6a allows users to perform such actions as construct, edit, display, annotate, save, and print out a graphical model, such as a block diagram, that visually and pictorially represents a dynamic system. The illustrative diagramming application 6 also includes graphical entities 6b, such as signal lines and buses that represent how data is communicated between functional and non-functional units, and blocks 6c. As noted above, blocks are the fundamental mathematical elements of a classic block diagram model. A block diagram execution engine 6d, also implemented in the application, is used to process a graphical model to produce simulation results or to convert the graphical model to executable code. For a block diagram graphical model, the execution engine 6d translates a block diagram to executable entities following the layout of the block diagram as provided by the user. The executable entities are compiled and executed on a computational device, such as a computer, to implement the functionality specified by the model. Typically, the code generation preserves a model hierarchy in a call graph of the generated code. For instance, each subsystem of a model in a block diagram environment can map to a user specified function and the generated code. Real-Time Workshop from the MathWorks, Inc. of Natick, Massachusetts is an example of a suitable execution engine 6d for generating code.

In the illustrative embodiment, the diagramming program 6 is implemented as a companion program to a technical computing program, such as MATLAB, also available from the MathWorks, Inc.

Figure 1B:
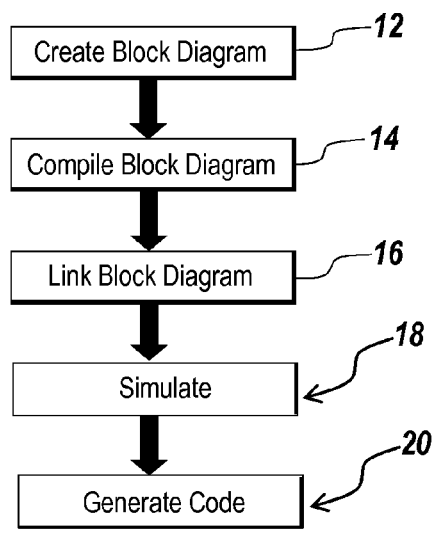
FIG. 1B is a flow chart illustrating the steps involved in simulating a dynamic system using the environment shown in FIG. 1A.

FIG. 1B is a flow chart diagramming the steps involved in simulating a dynamic system according to an illustrative embodiment of the invention. In step 12, a user creates a block diagram model representing a dynamic system. Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs. After creating the block diagram model in step 12, the execution engine 6d compiles the block diagram in step 14. Then, in step 16, the execution engine links the block diagram in to produce an "in-memory executable" version of the model. In step 18, the execution engine uses the "in-memory executable" version of the model to generate code and/or simulate a block diagram model by executing the model in step 18 or 20.

The block diagram editor 6a is the user interface component that allows a user to create and modify a block diagram model representing a dynamic system, in step 12. The blocks in the electronic block diagram may model the behavior of specialized mechanical, circuit or software components, such as motors, servo-valves, power plants, blocks, tires, modems, receivers, and other dynamic components. The block diagram editor 6a also allows a user to create and store data relating to graphical entities 6b. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of user interface tools within the block diagram editor 6a allows users to draft a block diagram model on the corresponding windows. For example, in Simulink® the user interface tools include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

Figure 2A:
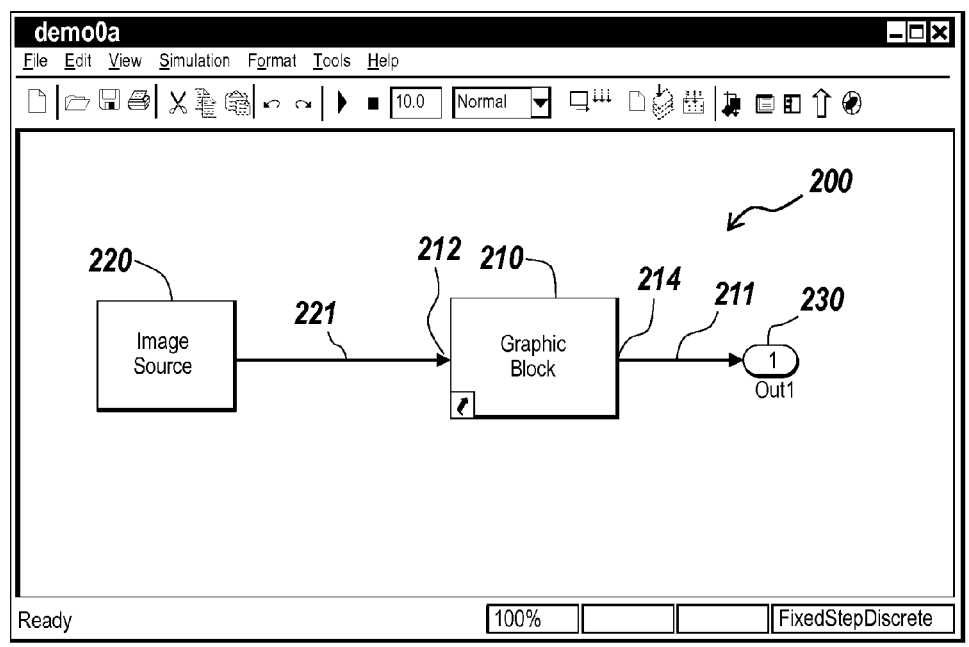
FIG. 2A is an example of a block diagram of a dynamic system in a graphical modeling environment.

A block diagram model of a dynamic system, created during step 12, is generally represented schematically as a collection of interconnected graphical objects, such as blocks, ports and lines, which represent signals. FIG. 2A illustrates an example of a block diagram 200 created using the diagramming application 6. Each block in the block diagram 200 represents an elemental dynamic system. Each signal, denoted by lines connecting the blocks, represents the input and/or output of an elemental dynamic system. The illustrative block diagram 200 includes a subsystem block 210, a source block 220 and a destination block 230. A line emanating at one block and terminating at another signifies that the output of the first block is an input to the second block. Ports, such as input port 212 and output port 214 of the subsystem block 210, refer to a distinct inputs or outputs on a block. Signals correspond to the time-varying quantities represented by each line connection and are assumed to have values at each time instant when their connected blocks are enabled. The source block 220 for a signal 221 writes to the signal at a given time instant when its system equations are solved. As shown, the signal 221 from the source block passes to the subsystem 210. The signal 211 outputted from the subsystem 210 passes to the destination block 230. The destination block 230 for a signal 211 reads from the signal 211 when the system equation is being solved. As shown, the signal 211 represents the output of the subsystem 210. One skilled in the art will recognize that the block diagram 200 is merely illustrative of a typical application and is not intended to limit the present invention in any way.

Figure 2B:
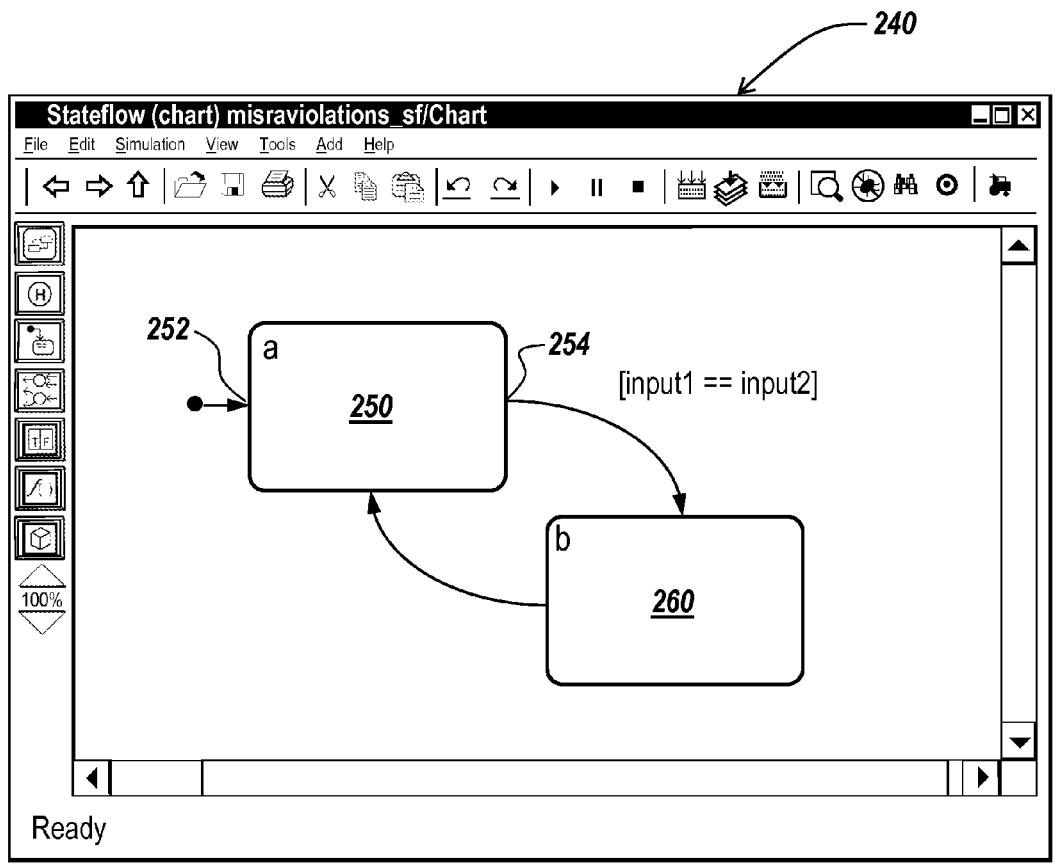
FIG. 2B is an example of a Stateflow® state chart in a graphical modeling environment.

FIG. 2B illustrates an example of a Simulink® diagram 240 containing Stateflow® blocks 250 and 260 created using the diagramming application 6. Each block in the block diagram 240 represents an elemental dynamic system. The sharing of data, denoted by lines connecting the blocks, represents the input and/or output of the system. A line emanating at one block and terminating at another signifies that the output of the first block is an input to the second block. Ports, such as input port 252 and output port 254 of the Stateflow® block 250, refer to distinct inputs or outputs on a block. One skilled in the art will recognize that the block diagram 240 is merely illustrative of a typical application and is not intended to limit the present invention in any way.

Figure 2C:
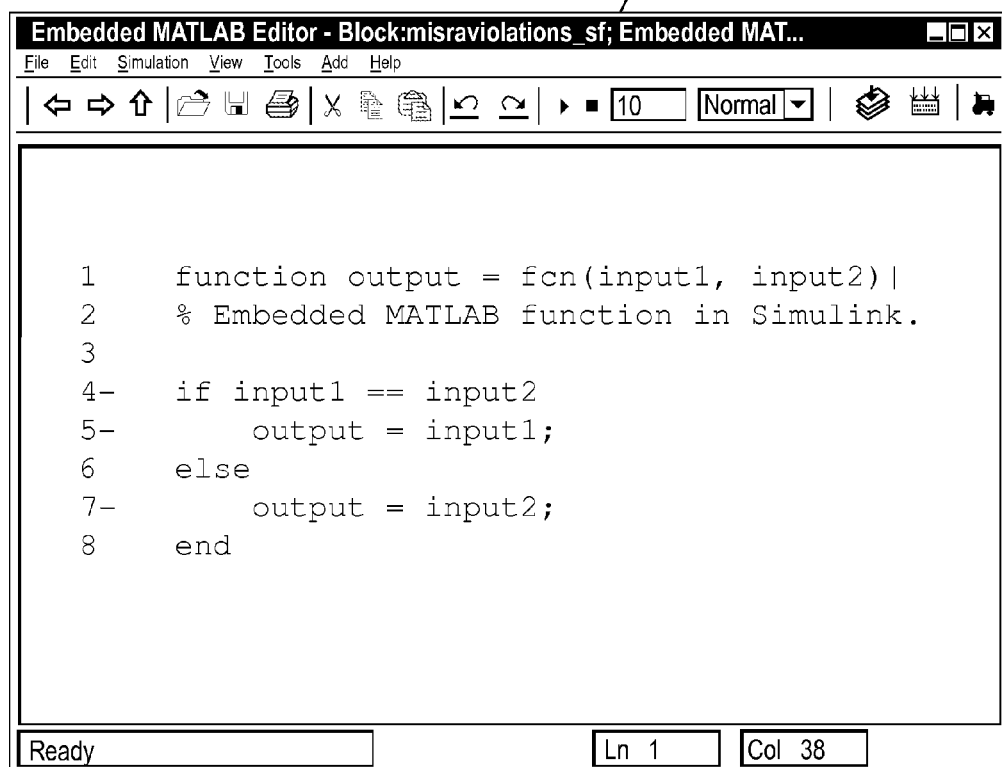
FIG. 2C is an example of MATLAB® embedded block for use in a graphical modeling environment.

FIG. 2C illustrates an example of an Embedded MATLAB block 270 created using the diagramming application 6. This block uses MATLAB code to describe its functionality. It may be used as any other type of block as part of a block diagram model.

Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs.

The compile stage in step 14 marks the start of model execution and involves preparing data structures and evaluating parameters, configuring and propagating block characteristics, determining block connectivity, and performing block reduction and block insertion. The compile stage involves checking the integrity and validity of the block interconnections in the block diagram. In this stage, the engine 6d also sorts the blocks in the block diagram into hierarchical lists that are used when creating the block method execution lists. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

The compilation step also determines actual block connectivity. Virtual blocks play no semantic role in the execution of a block diagram. During compilation, the virtual blocks and signals, such as virtual bus signals, in the block diagram are optimized away (removed) and the remaining non-virtual blocks are reconnected to each other appropriately. This compiled version of the block diagram with actual block connections is used from this point forward in the execution process.

In the link stage, in step 16, the execution engine 6d uses the result of the compilation stage to allocate memory needed for the execution of the various components of the block diagram. The linking stage also produces block method execution lists, which are used by the simulation or linearization of the block diagram. Included within the link stage is the initialization of the model, which consists of evaluating "setup" methods (e.g. block start, initialize, enable, and constant output methods). The block method execution lists are generated because the simulation and/or linearization of a model must execute block methods by type (not by block) when they have a sample hit.

The compiled and linked version of the block diagram may be directly utilized to execute the model over the desired time-span, in step 18. In step 20, the execution engine may choose to translate the block diagram model (or portions of it) into either software modules or hardware descriptions (broadly termed "code"). The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

Figure 3:
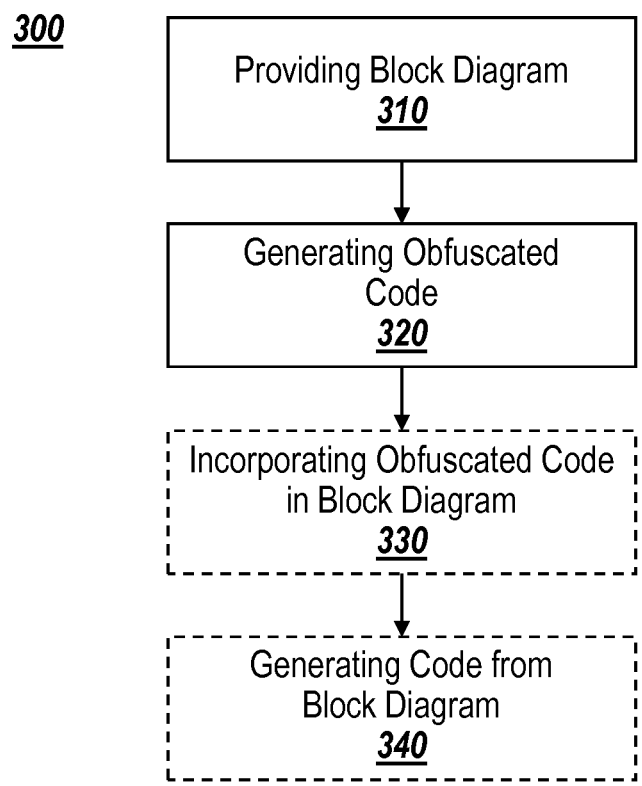
FIG. 3 is a flow chart illustrating an exemplary embodiment of the method of the present invention.

FIG. 3 depicts a flowchart 300 of one exemplary embodiment of a method of the present invention. Here the method involves providing a block diagram model of a dynamic system 310 and generating obfuscated code from the block diagram 320. In some embodiments the method may also include incorporating the obfuscated code into a block diagram 330 from which code may be generated 340.

Source code for a model can be generated using a tool such as the Real-Time Workshop® tool for Simulink models. Using such a tool, the engine (upon the behest of the user) translates a selected portion of the block diagram (or the entire block diagram itself) into code. Such code could be in a number of possible forms. Provided with the Simulink product family is the Target Language Compiler (TLC). This technology enables the creation of "active scripts" that control how the generated code is produced for a block diagram. Using TLC, one can tailor the generated code to suit one's specific needs.

Figure 4:
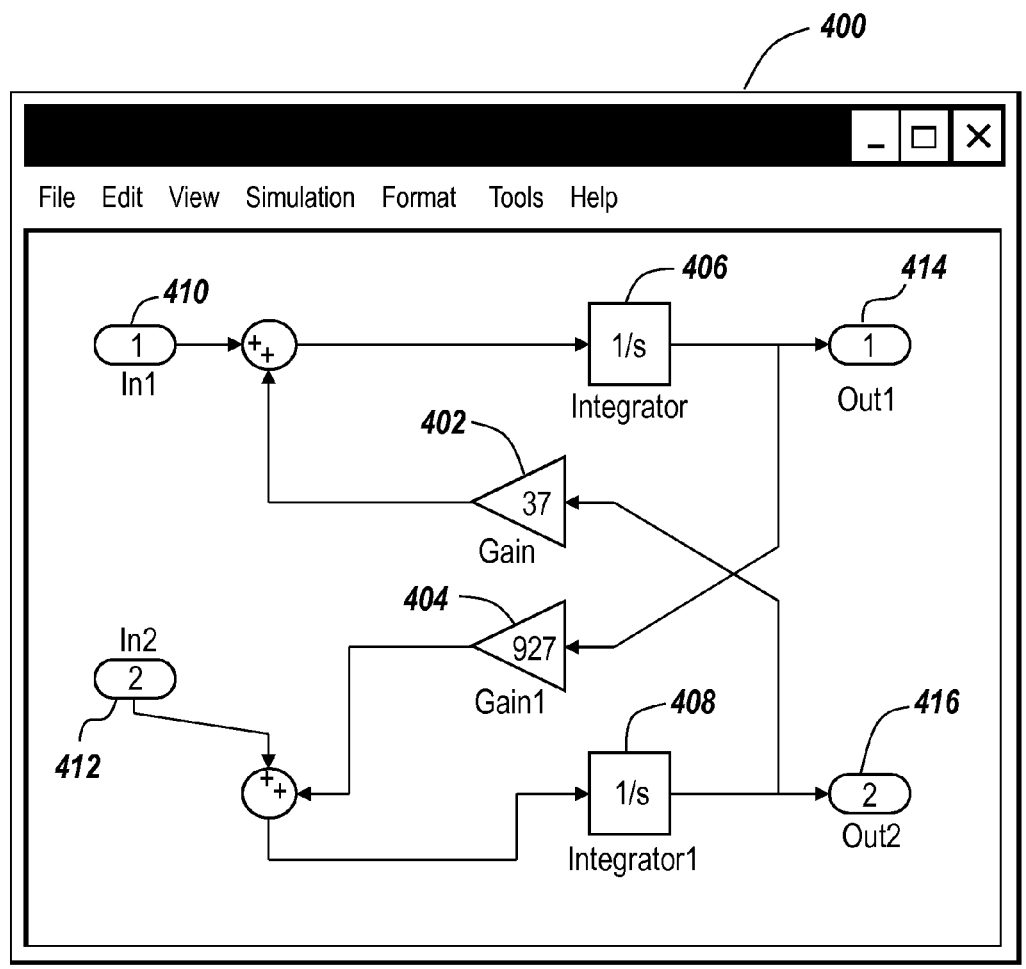
FIG. 4 is an example of a block diagram as set forth in the method of FIG. 3.

An example of a block diagram model 400 of a dynamic system can be seen in FIG. 4. Here the block diagram model 400 is an algorithm designed by the user using gain blocks 402, 404 and integrator blocks 406, 408 that receives two inputs 410, 412 and provides two outputs 414, 416. It will be understood that this is but one example of any number of possible block diagrams. Other systems will be apparent to one skilled in the art given the benefit of this disclosure.

After designing the algorithm of FIG. 4, a user may wish to share the model with a third party without letting the third party know anything about the algorithm. The third party will need the source code to be able to compile the model for use. Thus, obfuscated code is generated 320.

Figure 5:
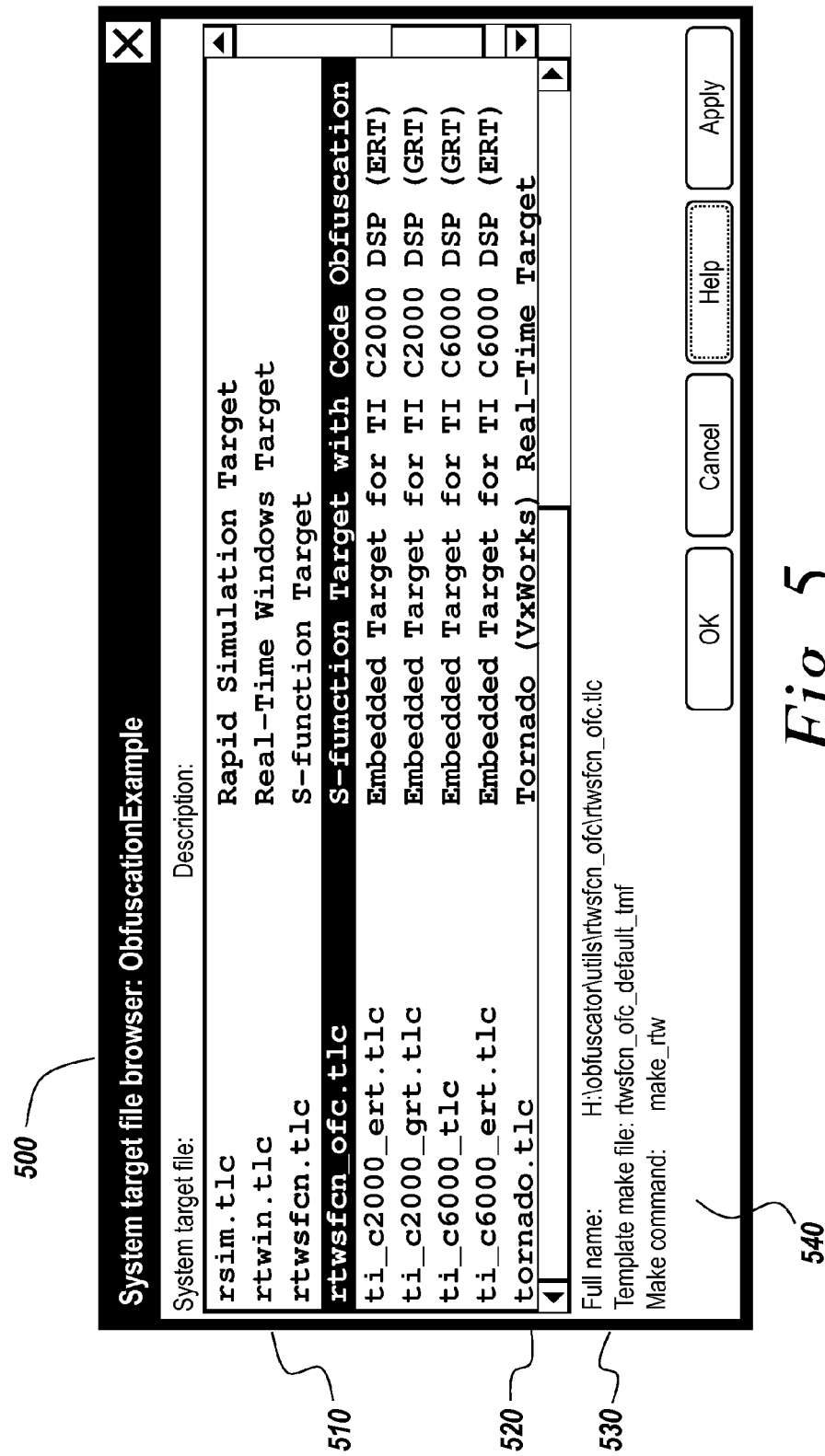
FIG. 5 is an example of a graphical interface for initiating code generation as set forth in the method of FIG. 3.

In certain embodiments the obfuscated code is generated by selecting a target that generates obfuscated code. This may be performed using a graphical interface. An example of this can be seen in FIG. 5. Here the graphical user interface is a system target file browser 500 provided with the Target Language Compiler (TLC) which is used to select a system target file 510 which in this case is an S-function target with code obfuscation. The browser also provides the user with the path name of the target 520, the Template make file 530 and the Make command 540.

Using the S-function target, you can build an S-function component and use it as an S-Function block in another model. The S-function code format used by the S-function target generates code that conforms to the Simulink C MEX S-function application programming interface (API). S-functions use a special calling syntax that enables interaction with Simulink equation solvers. This interaction is very similar to the interaction that takes place between the solvers and built-in Simulink blocks. The form of an S-function is very general and can accommodate continuous, discrete, and hybrid systems.

Traditionally, an S-function target can be used to protect designs and algorithms. By generating an S-function from a proprietary model or algorithm and compiling it into a binary form, one can share the model's functionality without providing the source code. While this may be a satisfactory solution for a typical simulation scenario, it is wholly unsatisfactory if you need to generate code and cross-compile a model on an independent platform. In such a case, the source code for the S-Function is required. But, by appropriately obfuscating the generated S-Function target code, the source code for an S-function can be provided to a third-party for purposes of simulation and code generation.

It will be understood that this is but one example of any number of possible ways of initiating the generation of code.

Other implementations and methodologies will be apparent to one skilled in the art given the benefit of this disclosure.

Figure 6:
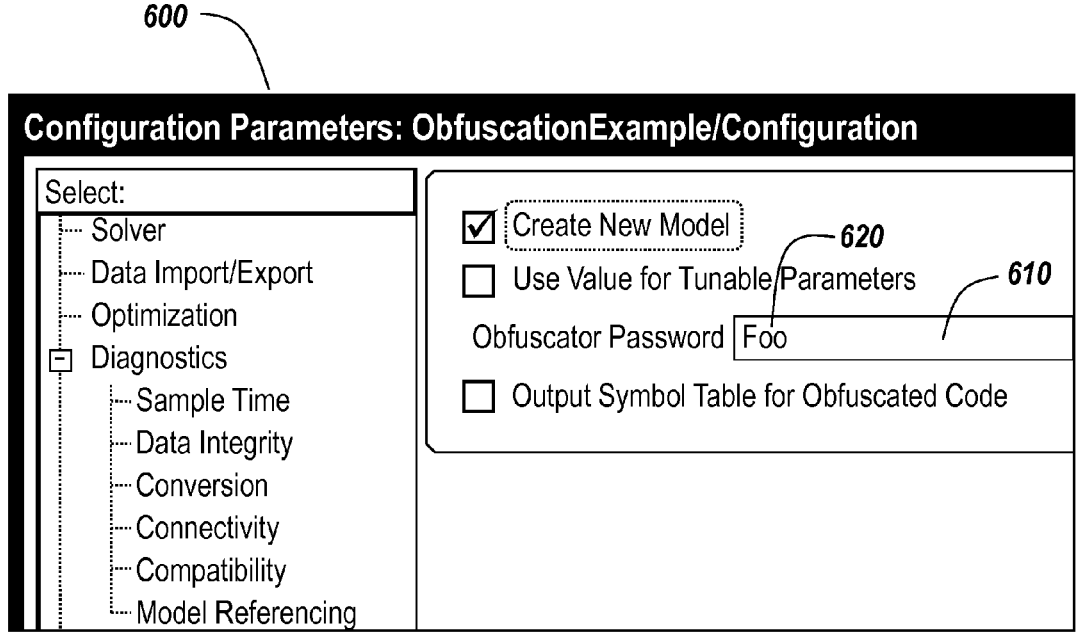
FIG. 6 is an example of a graphical interface for providing a password for obfuscation.

In certain embodiments the obfuscation is performed in a deterministic method. This means a symbol will always be obfuscated in the same obfuscated string. In certain embodiments the user provides a password that breaks the determinism of the obfuscation. This may be done using a graphical interface 600 such as that provided by the Target Language Compiler (TLC) for setting configuration parameters, an example of which is shown in FIG. 6. Here an Obfuscator Password field 610 is provided for the user to enter a password 620. Using this password 620 allows a user to break the determinism of the obfuscation.

Figure 7:
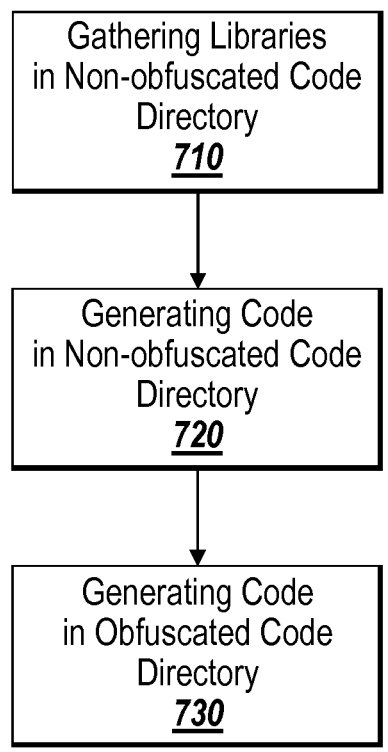
FIG. 7 is an exemplary flow diagram of a method of generating obfuscated code as set forth in FIG. 3.

In certain embodiments, when the obfuscated code is generated, the related files necessary for compiling the code, such as the library and header files, are also obfuscated. FIG. 7 depicts a flow chart 700 of one exemplary method of generating obfuscated code as shown in FIG. 3. The first step in the method involves gathering all the required libraries in a first directory, step 710. In this case, for example, the first directory may be a designated non-obfuscated code directory. The next step is generating non-obfuscated code in the first directory, step 720. As in the first step, the code may be placed in the designated non-obfuscated code directory. Finally, the non-obfuscated code in the first directory is converted to obfuscated code in a second directory, step 730. In this case, for example, this involves converting the C text files of the non-obfuscated code as well as non-system header files required by the C text files. The second directory where the obfuscated code is placed may be a designated obfuscated code directory. It will be understood that this is but one possible method of generating obfuscated code. For example, a user may be only provided with obfuscated code and not the non-obfuscated code. Other embodiments and implementations will be apparent to one skilled in the art given the benefit of this disclosure.

Figure 8:
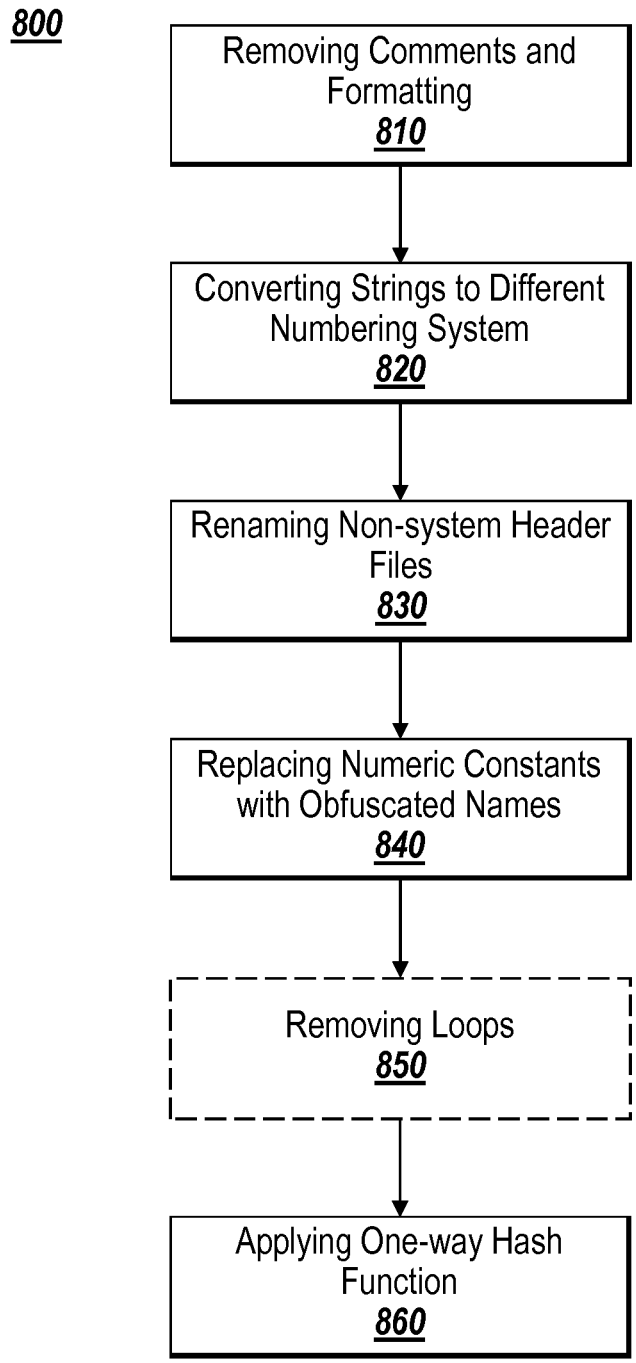
FIG. 8 is an exemplary flow diagram of a method of converting non-obfuscated code to obfuscated code as set forth in FIG. 7.

FIG. 8 depicts a flow chart 800 of one exemplary method of converting non-obfuscated code to obfuscated code. The method involves the following processes. Comments and formatting are removed from the non-obfuscated code, 810. Strings are converted to a different numbering system, 820. Non-system header files are renamed, 830. Numeric constants are replaced with obfuscated names, 840. In some embodiments, loops may be removed from the code, 850. Then a one-way hash function is applied to the code, 860.

The process of removing comments and formatting from the code (process 810) serves to eliminate features from the code that increase readability and possibly indicated structure for a human reader but are not necessary for compiling.

The process of converting the strings into different numbering system (process 820) serves to decrease the readability for a human but does not effect the compiling of the code. In certain embodiments the strings may be converted to a base 8 numbering system (octal). In other embodiments, the strings may be converted to a base 16 numbering system (hex). Other possible numbering systems will be apparent to one skilled in the art given the benefit of this disclosure.

The process of converting remaining non-system header files (process 830) also serves to decrease readability. By giving non-system header files meaningless names the likelihood of discerning functionality is reduced because possibly descriptive names that could indicate functionality have been removed. Again this only decreases readability for a human it does not affect compiling.

The process of replacing numeric constants with obfuscated names (process 840) is another measure to reduce readability by humans. To do this the numeric constants are placed in a header file and are assigned a "macro name. For example, the constant 2.0 may be placed in a header file as follows:
define _XHBOIUDFASKDJHFLAJHDFLJ 2.0
Then _XHBOIUDFASKDJHFLAJHDFLJ is used everywhere that 2.0 is used in the code. When the code is compiled the compiler replaces all uses of _XHBOIUDFASKDJHFLAJHDFLJ with 2.0 during compilation.

The optional process of removing loops (process 850) is again another way to eliminate features from the code that could possibly indicate structure for a human reader but are not necessary for compiling. This technique may also be performed with other types of flow control such as if-then statements and switches.

It will be understood that the flow chart 800 shown here represents just one of several possible orderings of processes. One skilled in the art would recognize that listed processes 810-850 can be performed in any number of combinations before the hash function is applied. It is also understood that other processes may be performed. Other possible processes will be apparent to one skilled in the art given the benefit of this disclosure.

The process of applying a one-way hash function (process 860) is the final step in obfuscating the code. Preferably the applied hash function is MD5. Hash functions are well known in the art and other suitable hash functions will be apparent given the benefit of this disclosure.

After the non-obfuscated code has been converted to obfuscated code, the resulting designated obfuscated code directory contains all the necessary files needed by a third party to compile a version of the model that will work on there system. The resulting model 910 from the obfuscated code generated from the model depicted in FIG. 4 can be seen in FIG. 9. Here is the model 910 is used as an S-Function. The third party may make calls to the resulting model just as they would to non-obfuscated S-Function. This S-function can thus be used in block diagrams from which source code, both obfuscated and non-obfuscated, can be generated.

Figure 9:
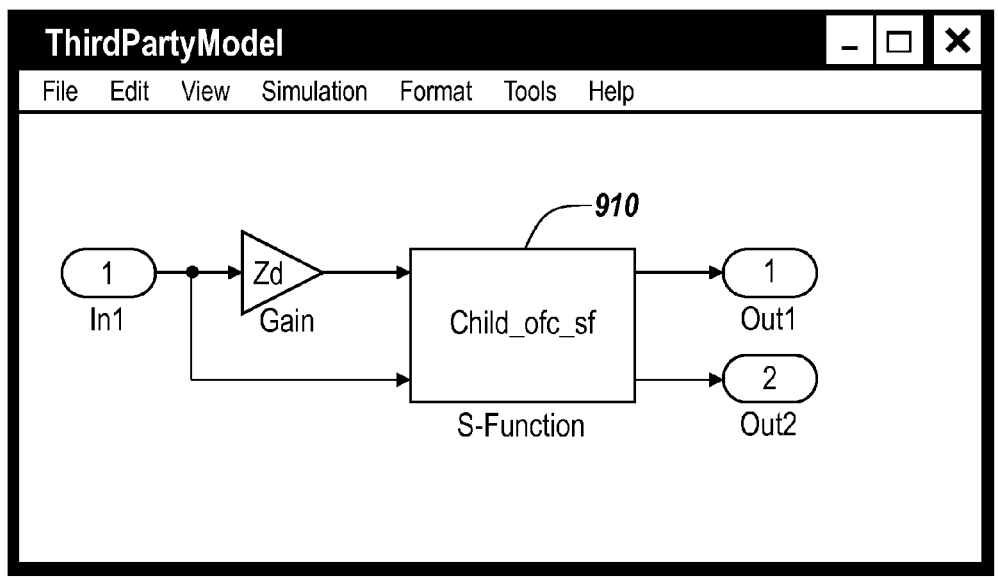
FIG. 9 is an example of a block diagram model resulting from using the obfuscated code.
Figure 10:
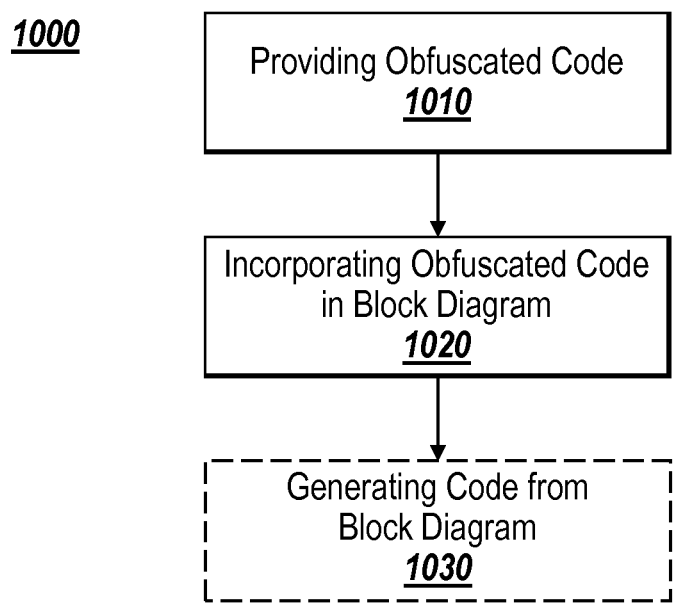
FIG. 10 is an exemplary flow diagram of a method using obfuscated code to in a block diagram to generate additional code.

FIG. 10 depicts a flow chart of one exemplary method 1000 of using the obfuscated source code for further code generation. Having been provided with obfuscated code 1010, the obfuscated code may be incorporated into a block diagram model 1020. Code may then be generated from the block diagram 1030. The block diagram incorporating the obfuscated code may be one such as shown in FIG. 9. Generation of code may be performed as known in the art or in the manner disclosed herein in the case of obfuscated code.

To better understand the process of obfuscation it may be helpful to look at examples of generated non-obfuscated code and the corresponding obfuscated code. Below is a snippet of non-obfuscated code that is generated in the method of FIG. 7 from the model depicted in FIG. 4. /*Sum: '<Root>/Sum' incorporates: Inport: '<Root>/In1'Gain: '<Root>/Gain'* Regarding '<Root>/Gain': Gain value: Child_P→Gain_Gain */ Child_B→Sum=*(((const real_T**) ssGetInputPortSignalPtrs(S, 0))[0])+(rtb_Integrator1*Child_P→Gain_Gain); /*Sum: '<Root>/Sum1' incorporates: Inport: '<Root>/In2'Gain: '<Root>/Gain1'* Regarding '<Root>/Gain1': Gain value: Child_P→Gain1_Gain */ Child_B→Sum1=* (((const real_T**) ssGetInputPortSignalPtrs(S, 1))[0])+ (rtb_Integrator*Child_P→Gain1_Gain);
Converting this code using the methods of FIG. 7 and FIG. 8 would yield the following snippet of obfuscated code:
bSq0bCxoIECPcW5PSpKMS0→_6Uw166Qgl5Ak_
  2Bkk_2Bk_=*(((const
  _Qgl5QcdaPeOV05NVG4KJG0**)

_jwmAjgoHAhoXAisXMRl4M_
  (_cW5PcOZG5O3NV05Nfjyuf2,
  _04JF0pF2Cok5Qgl5VNKLH0))[_
  04JF0pF2Cok5Ql5VNKLH0])+(_
  2DsV2uW6TsGfhqPfnBnBn_*_edaPel3IBlo__2Bk__
  6Rk06_→
  _7W3H7_G5OZ07V__17gm9fgl);
_bSq0bCxoIECPcW5PSpKMS0→_QhpLQWCqNYC5NV
  05eeeee1=*(((const_Qgl5QcdaPeOV05NVG4KJG0**)
  _jwmAjgoHAhoXAisXMRl4M_(
  _cW5PcOZG5O3NV05Nfjyuf2,
     _zyvjzaRm8bBH7W3HTudbTl))
     [_04JF0pF2Cok5Qgl5VNKLH0])+
     (_cX9ec5Rk06w3IBl34KJG40*
_edaPel3IBlo__2Bk__
  6Rk06_→_VNKLHxl6Uwl2Ewk27X7X71);

As the obfuscation is deterministic in some embodiments, in certain embodiments, for the purpose of debugging, the user may be provided with an option of generating a symbol table that lists the original symbols and their obfuscated names.

It should also be understood that in some embodiments only portions of the generated code may be obfuscated while other portions are not obfuscated. The portion of the generated code that is obfuscated can be automatically selected based on functional criteria of the block diagram model, the functional criteria of the generated code, or selected by the user. The criteria may be any of the semantic and syntactic notions that affect the execution and editing of the model or generation of code. Examples include components that contain look-up tables or exported global variables.

In other embodiments portions of code may be obfuscated separately and require a different password to break the obfuscation for each portion. Further more layers of obfuscation may be employed. For example the entire code may be obfuscated using one password while portions of code within the entire code may be independently obfuscated using separate passwords.

Figure 11:
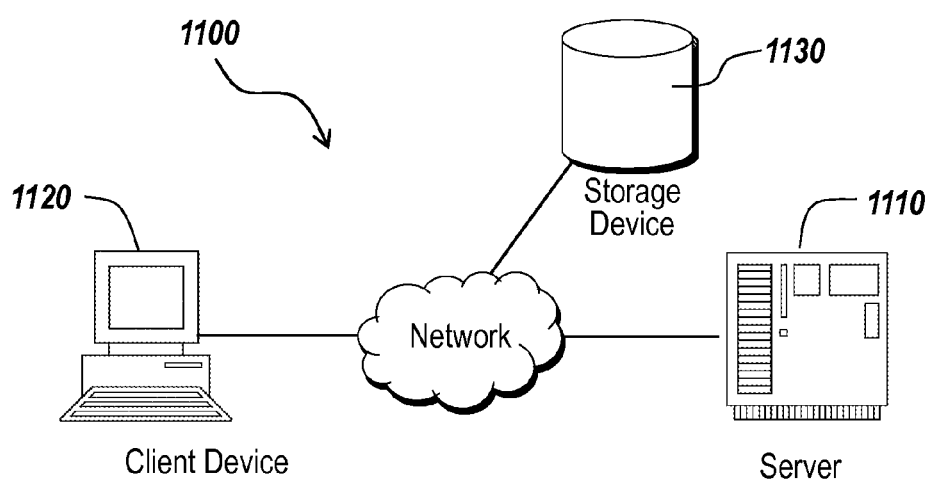
FIG. 11 illustrates an exemplary client-server environment suitable for practicing an illustrative embodiment of the present invention.

The examples to this point have focused primarily on the system where the graphical modeling environment was on a local computational device, in one embodiment an electronic device. The graphical modeling environment may of course also be implemented on a network 1100, as illustrated in FIG. 11, having a server 1110 and a client device 1120. Other devices, such as a storage device 1130, may also be connected to the network.

In one such embodiment a system for generating and displaying a graphical modeling application, comprises a distribution server for providing to a client device, obfuscated code generated from a block diagram; and a client device in communication with the distribution server. Here the distribution server provides a client device, such as an electronic device discussed above, with obfuscated code. The client may then use the obfuscated code to compile a model for use at the client device. In some embodiments, the obfuscated code may be used as part of block diagram model. In such cases, code may also be generated from this block diagram.

In another embodiment, a user may then interact with a graphical modeling interface on the server through the client device. In one example of such a system a server and client device are provided. The server is capable of executing a graphical modeling environment. The client device is in communication with the server over a network. The server receives from the client device, a request to generate code from the block diagram. The server generates obfuscated code from the block diagram. The client device then receives from the server the obfuscated code.

It will be understood by one skilled in the art that these network embodiments are exemplary and that the functionality may be divided up in any number of ways over a network.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. A computing device-implemented method comprising:
  receiving a first graphical model;
  generating, by a processor of the computing device, textual code for the first graphical model, the generating including:
    generating a plurality of related files required for compiling the generated textual code;
  converting the generated textual code for the first graphical model into obfuscated textual code, the converting including:
    converting the plurality of related files to plurality of obfuscated related files;
  receiving a second graphical model, where:
    the second graphical model includes the first graphical model, and
    the second graphical model is executable;
  incorporating the obfuscated textual code into the second graphical model using a graphical element, where:
    the incorporating associates the plurality of obfuscated related files with the second graphical model, and
    the obfuscated textual code interacts with a portion of the second graphical model, the interacting comprising:
      receiving output from the portion of the second graphical model, or
      providing input to the portion of the second graphical model; and
  generating code for the second graphical model, the generating comprising:
    incorporating the obfuscated textual code into the generated code.

2. The computing device-implemented method of claim 1, wherein converting the generated textual code for the first graphical model into obfuscated textual code comprises:
  selecting one or more obfuscation techniques based on functional criteria of the first graphical model and/or functional criteria of the generated textual code.

3. The computing device-implemented method of claim 2, wherein the one or more obfuscation techniques comprise at least one of: altering or removing comments from the generated textual code.

4. The computing device-implemented method of claim 2, wherein the one or more obfuscation techniques comprises:
  altering a representation of one or more strings in the generated textual code.

5. The computing device-implemented method of claim 2, wherein the one or more obfuscation techniques comprises:
  applying a one-way hash function to the generated textual code.

13

6. A non-transitory computer-readable medium storing instructions that, when executed on a processor, cause the processor to:
   receive a first graphical model;
   generate textual code for the first graphical model, the generating including:
      generating a plurality of related files required for compiling the generated textual code;
   convert the generated textual code for the first graphical model into obfuscated textual code, the converting including:
      converting the plurality of related files to plurality of obfuscated related files;
   receive a second graphical model, where:
      the second graphical model includes the first graphical model, and
      the second graphical model is executable; and
   incorporate the obfuscated textual code into the second graphical model using a graphical element, where:
      the incorporating associates the plurality of obfuscated related files with the second graphical model, and
      the obfuscated textual code interacts with a portion of the second graphical model, the interacting comprising:
         receiving output from the portion of the second graphical model, or
         providing input to the portion of the second graphical model; and
   generate code for the second graphical model, the generating comprising:
      incorporating the obfuscated textual code into the generated code.

7. The non-transitory computer-readable medium of claim 6, wherein instructions for converting the generated textual code for the first graphical model into obfuscated textual code comprise instructions for selecting one or more obfuscation techniques based on functional criteria of the graphical model and/or functional criteria of the generated textual code.

8. The non-transitory computer-readable medium of claim 7, wherein the one or more obfuscation techniques comprise at least one of: altering comments or removing comments from the generated textual code.

9. The non-transitory computer-readable medium of claim 7, wherein the one or more obfuscation techniques comprise altering a representation of one or more strings in the generated textual code.

10. The non-transitory computer-readable medium of claim 7, wherein the one or more obfuscation techniques comprise applying a one-way hash function to the generated textual code.

11. The non-transitory computer-readable medium of claim 7, wherein the one or more obfuscation techniques comprise renaming non-system header files.

12. The non-transitory computer-readable medium of claim 7, wherein the one or more obfuscation techniques comprise replacing constants with obfuscated representations.

13. The non-transitory computer-readable medium of claim 6, further storing instructions that, when executed on the processor, cause the processor to:
   compile the obfuscated textual code.

14. The non-transitory computer-readable medium of claim 13, further storing instructions that, when executed on the processor, cause the processor to:
   obfuscate files necessary to compile the obfuscated textual code.

14

15. The non-transitory computer-readable medium of claim 6, wherein the obfuscation is deterministic.

16. The non-transitory computer-readable medium of claim 15, further storing instructions that, when executed on the processor, cause the processor to:
   receive an indication from a user to break determinism of the obfuscation; and
   wherein instructions for converting the generated textual code to obfuscated textual code comprise instructions for generating the obfuscated textual code in a non-deterministic manner.

17. The non-transitory computer-readable medium of claim 6, wherein instructions for converting the generated textual code into obfuscated textual code further comprise instructions for converting files containing functionality as well as non-system interface files used by the functionality files.

18. The non-transitory computer-readable medium of claim 17, wherein the functionality files are C files and the interface files are header files.

19. A computer-implemented system comprising:
   a memory storing a first graphical model;
   a processor executing instructions for generating textual code for the first graphical model, the generating including:
      generating a plurality of related files required for compiling the generated textual code;
   a converter for converting the generated textual code for the first graphical model into obfuscated textual code, the converting including:
      converting the plurality of related files to plurality of obfuscated related files;
   wherein the memory stores:
      a second graphical model, where:
         the second graphical model includes the first graphical model,
         the obfuscated textual code is incorporated into the second graphical model using a graphical element,
         the second graphical model is executable,
         the incorporating associates the plurality of obfuscated related files with the second graphical model, and
         the obfuscated textual code interacts with a portion of the second graphical model, the interacting comprising:
            receiving output from the portion of the second graphical model, or
            providing input to the portion of the second graphical model; and
      code generated from the second graphical model, the code generated from the second graphical model including the obfuscated textual code.

20. A non-transitory computer readable medium storing instructions that, when executed on a processor, cause the processor to:
   receive a first graphical model;
   generate textual code for at least a portion of the first graphical model, the generating including:
      generating a plurality of related files required for compiling the generated textual code;
   convert the generated textual code for at least the portion of the first graphical model into obfuscated textual code, where the converting includes:
      converting the plurality of related files to plurality of obfuscated related files, and
      applying a one-way hash function to the generated textual code;

incorporate the generated obfuscated textual code into a second graphical model using a graphical element, where:
the second graphical model is executable,
the incorporating associates the plurality of obfuscated related files with the second graphical model, and
the obfuscated textual code interacts with a portion of the second graphical model, the interacting comprising:
receiving output from the portion of the second graphical model, or
providing input to the portion of the second graphical model; and
generate code for the second graphical model, the generating comprising:
incorporating the obfuscated textual code into the generated code.

21. The non-transitory computer-readable medium of claim 20, wherein the second graphical model is the same as the first graphical model.

22. The non-transitory computer-readable medium of claim 20, wherein instructions for converting the generated textual code into obfuscated textual code further comprise instructions for:
structurally manipulating textual code while preserving functionality of the textual code.

23. The non-transitory computer-readable medium of claim 22, wherein instructions for structurally manipulating textual code further comprise instructions for at least one or a combination of:
replacing constants with obfuscated representations;
altering or removing comments from the generated textual code;
altering a representation of one or more strings in the generated textual code; and
changing location of sections of the generated textual code relative to each other.

24. A computing device-implemented method comprising:
receiving a first graphical model;
generating, by a processor of the computing device, textual code for at least a portion of the first graphical model, the generating including:
generating a plurality of related files required for compiling the generated textual code;
converting the generated textual code for at least the portion of the first graphical model into obfuscated textual code, where the converting includes:
converting the plurality of related files to plurality of obfuscated related files, and
applying a one-way hash function to the generated textual code; and
incorporating the generated obfuscated textual code into a second graphical model via a graphical element, where:
the second graphical model is executable,
the incorporating associates the plurality of obfuscated related files with the second graphical model, and
the obfuscated textual code interacts with a portion of the second graphical model, the interacting comprising:
receiving output from the portion of the second graphical model, or
providing input to the portion of the second graphical model; and
generating code for the second graphical model, the generating comprising:
incorporating the obfuscated textual code into the generated code.

* * * * *

UNITED STATES PATENT AND TRADEMARK OFFICE
CERTIFICATE OF CORRECTION

PATENT NO. : 8,832,646 B1
APPLICATION NO. : 12/732551
DATED : September 9, 2014
INVENTOR(S) : Bill Wendling It is certified that error appears in the above-identified patent and that said Letters Patent is hereby corrected as shown below:

Title page, in item (45), insert --*-- before "Sep. 9, 2014".

Title page, column 1, in item (*), after "941 days.", Insert --This patent is subject to a terminal disclaimer.--.

Tile page, column 2, in item (56), at line 5 under "Other Publications" replace "adn" with --and--.

Title page, column 2, in item (56), at line 6 under "Other Publications" replace "retreived" with --retrieved--.

Signed and Sealed this
Thirtieth Day of December, 2014

Michelle K. Lee
*Deputy Director of the United States Patent and Trademark Office*